(12) United States Patent
Tsukamoto et al.

(10) Patent No.: US 10,116,173 B2
(45) Date of Patent: Oct. 30, 2018

(54) PARKING ASSISTANCE DEVICE AND PARKING ASSISTANCE METHOD

(71) Applicant: NISSAN MOTOR CO., LTD., Yokohama-shi, Kanagawa (JP)

(72) Inventors: Yukinori Tsukamoto, Kanagawa (JP); Kengo Maikawa, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/546,795

(22) PCT Filed: Jan. 29, 2015

(86) PCT No.: PCT/JP2015/052509
§ 371 (c)(1),
(2) Date: Jul. 27, 2017

(87) PCT Pub. No.: WO2016/121050
PCT Pub. Date: Aug. 4, 2016

(65) Prior Publication Data
US 2018/0019623 A1    Jan. 18, 2018

(51) Int. Cl.
*B60L 11/18* (2006.01)
*H02J 50/90* (2016.01)

(52) U.S. Cl.
CPC .............. *H02J 50/90* (2016.02); *B60L 11/182* (2013.01); *B60L 11/1838* (2013.01); *B60L 2230/16* (2013.01)

(58) Field of Classification Search
CPC .............. B60L 11/182; B60L 11/1838; B60L 2230/16; H02J 50/90
USPC .......................................................... 701/22
See application file for complete search history.

(56) References Cited

U.S. PATENT DOCUMENTS

| | | | | |
|---|---|---|---|---|
| 5,498,948 A | * | 3/1996 | Bruni | B60L 11/1816 320/108 |
| 5,617,003 A | * | 4/1997 | Odachi | B60L 11/182 320/108 |
| 5,821,731 A | * | 10/1998 | Kuki | B60L 11/1805 320/108 |

(Continued)

FOREIGN PATENT DOCUMENTS

| | | |
|---|---|---|
| DE | 2011083427 A1 | 3/2013 |
| JP | 2011-015549 A | 1/2011 |

(Continued)

OTHER PUBLICATIONS

European Extended Search Report, dated Mar. 27, 2018, 8 pages.

*Primary Examiner* — Tyler J Lee
(74) *Attorney, Agent, or Firm* — Foley & Lardner LLP

(57) ABSTRACT

The parking assistance device is used in a wireless power supply system which performs wireless power supply between the power transmitting coil on a ground side and the power receiving coil on a vehicle side, and includes: three or more coils aligned in one direction in a plan view of the vehicle, the coils configured to detect magnetic flux in a height direction of the vehicle which is generated by the power transmitting coil; and a misalignment detection unit configured to detect misalignment between the power transmitting coil and the power receiving coil in the one direction, based on a decrease in the magnetic flux in the height direction of the vehicle which is detected by the three or more coils.

10 Claims, 13 Drawing Sheets

(56) References Cited

U.S. PATENT DOCUMENTS

| | | | | |
|---|---|---|---|---|
| 9,236,758 B2* | 1/2016 | Fisher | | H02J 5/005 |
| 9,631,950 B2* | 4/2017 | Raedy | | B60L 11/182 |
| 9,653,206 B2* | 5/2017 | Keeling | | H01F 38/14 |
| 9,739,641 B2* | 8/2017 | Raedy | | G01D 5/20 |
| 9,739,844 B2* | 8/2017 | Widmer | | G01R 33/0047 |
| 2010/0161217 A1 | 6/2010 | Yamamoto | | |
| 2010/0230197 A1* | 9/2010 | Ortmann | | B60L 11/1818 |
| | | | | 180/168 |
| 2010/0235006 A1* | 9/2010 | Brown | | B60L 11/182 |
| | | | | 700/286 |
| 2010/0277121 A1* | 11/2010 | Hall | | B60L 11/182 |
| | | | | 320/108 |
| 2011/0254503 A1* | 10/2011 | Widmer | | B60L 11/182 |
| | | | | 320/108 |
| 2012/0032632 A1* | 2/2012 | Soar | | H01F 38/14 |
| | | | | 320/108 |
| 2012/0262002 A1* | 10/2012 | Widmer | | H02J 50/12 |
| | | | | 307/104 |
| 2013/0033224 A1 | 2/2013 | Raedy | | |
| 2014/0339923 A1* | 11/2014 | Simopoulos | | H02J 5/005 |
| | | | | 307/149 |
| 2015/0008752 A1* | 1/2015 | Boys | | B60L 11/182 |
| | | | | 307/104 |
| 2015/0028687 A1* | 1/2015 | Ichikawa | | H01F 38/14 |
| | | | | 307/104 |
| 2015/0115728 A1 | 4/2015 | Yamamoto et al. | | |
| 2015/0180285 A1* | 6/2015 | Yamakawa | | B60L 11/182 |
| | | | | 307/104 |
| 2015/0332827 A1* | 11/2015 | Omori | | H01F 38/14 |
| | | | | 307/104 |
| 2016/0025821 A1* | 1/2016 | Widmer | | G01R 33/0047 |
| | | | | 324/258 |
| 2016/0325631 A1* | 11/2016 | Lannoije | | B60L 11/182 |

FOREIGN PATENT DOCUMENTS

| | | |
|---|---|---|
| JP | 2013-9545 A | 1/2013 |
| JP | 2014-023414 A | 2/2014 |
| JP | 2014-183621 A | 9/2014 |
| JP | 2014-183715 A | 9/2014 |
| JP | 2015-82876 A | 4/2015 |
| JP | 2015-111996 A | 6/2015 |
| WO | WO 2012/121184 A1 | 9/2012 |
| WO | WO 2013/045216 A1 | 4/2013 |
| WO | WO 2014/103795 A1 | 7/2014 |
| WO | WO-2014/174361 A2 | 10/2014 |

* cited by examiner

FIG. 2
(a)
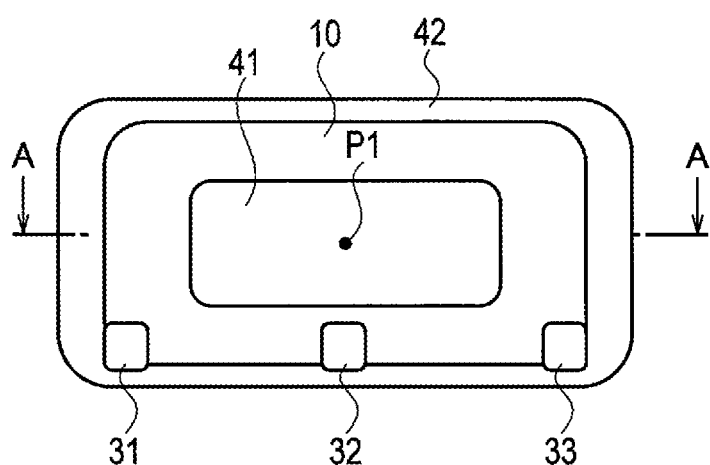
(b)
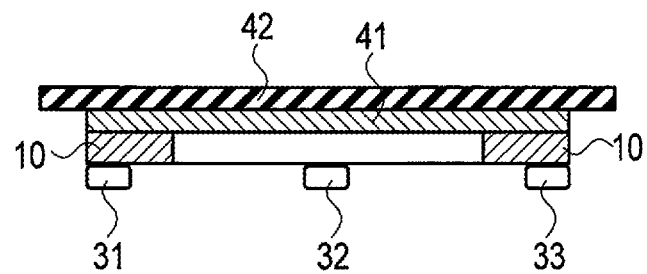

FIG. 3
(a)
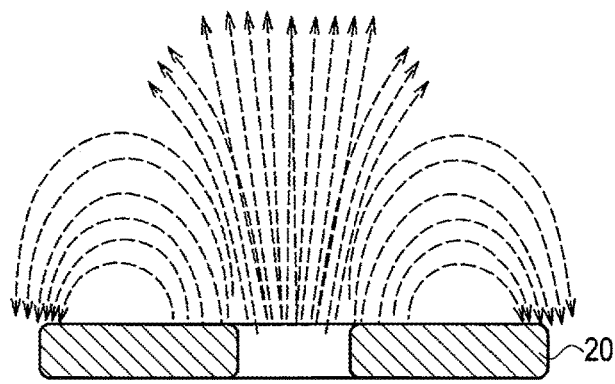
(b)
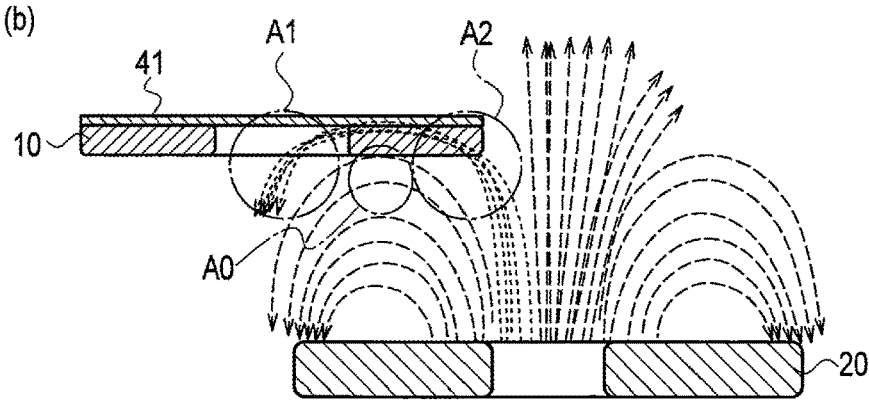
(c)
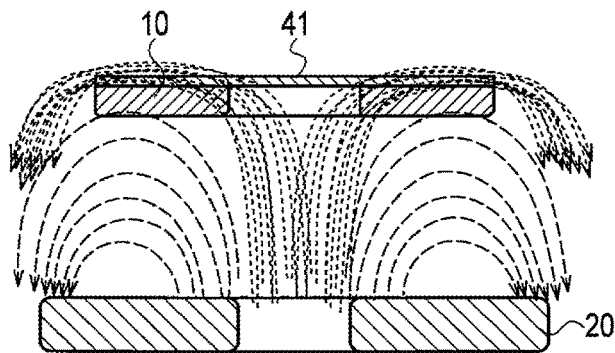

FIG. 9
(a)
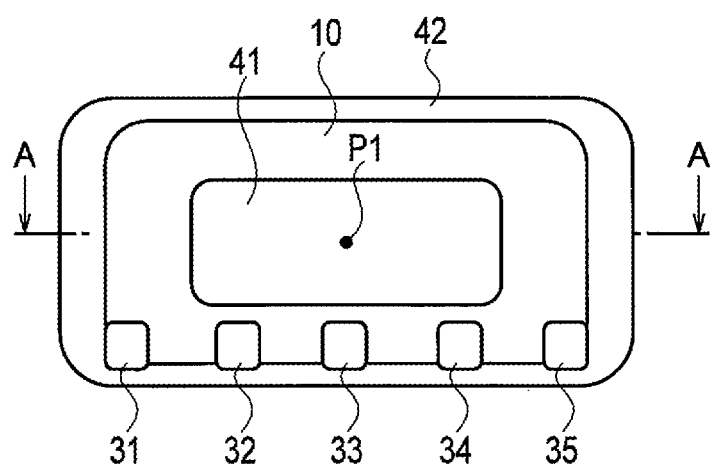
(b)
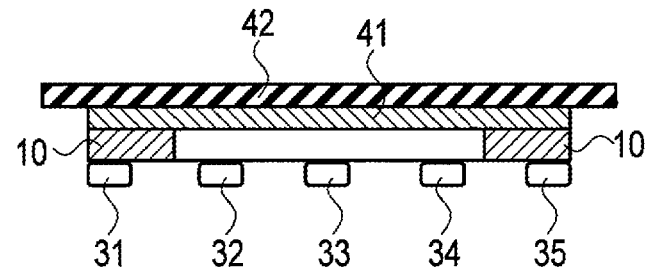

PARKING ASSISTANCE DEVICE AND PARKING ASSISTANCE METHOD

TECHNICAL FIELD

The present invention relates to a parking assistance device and a parking assistance method.

BACKGROUND ART

A wireless power supply system which charges a battery included in a vehicle by contactlessly supplying power to the vehicle is conventionally known. The wireless power supply system performs charging with a power transmitting coil on a ground side aligned with (facing) a power receiving coil on a vehicle side. There is known a method of detecting misalignment between the power transmitting coil and the power receiving coil, including calculating a positional relationship between the power transmitting coil and the power receiving coil by using a camera, for aligning the power receiving coil with (cause the power receiving coil to face) the power transmitting coil (see Patent Literature 1).

CITATION LIST

Patent Literature

Patent Literature 1: Japanese Patent Application Publication No. 2011-15549

SUMMARY OF INVENTION

However, in the method described in Patent Literature 1, the camera is used to calculate the positional relationship between the power transmitting coil and the power receiving coil, and this is costly.

The present invention has been made in view of the problem described above and an object thereof is to provide a parking assistance device and a parking assistance method which can detect misalignment between a power transmitting coil and a power receiving coil with a low-cost configuration.

A parking assistance device and a parking assistance method in one aspect of the present invention are used in a wireless power supply system which performs wireless power supply between a power transmitting coil on a ground side and a power receiving coil on a vehicle side. The parking assistance device and the parking assistance method: detect magnetic flux in a height direction of the vehicle which is generated by the power transmitting coil, by using three or more coils aligned in one direction in a plan view of the vehicle; and detect misalignment between the power transmitting coil and the power receiving coil in the one direction, based on a decrease in the magnetic flux in the height direction of the vehicle which is detected by the three or more coils.

Part (a) of FIG. 2 is a bottom view illustrating an example of a power receiving coil and its vicinity in the first embodiment, and part (b) of FIG. 2 is a cross-sectional view taken along the cross section A-A in part (a) of FIG. 2.

Parts (a) to (c) of FIG. 3 are schematic views illustrating changes in magnetic flux which occur when the power receiving coil comes close to a power transmitting coil in the first embodiment.

Figure 4:
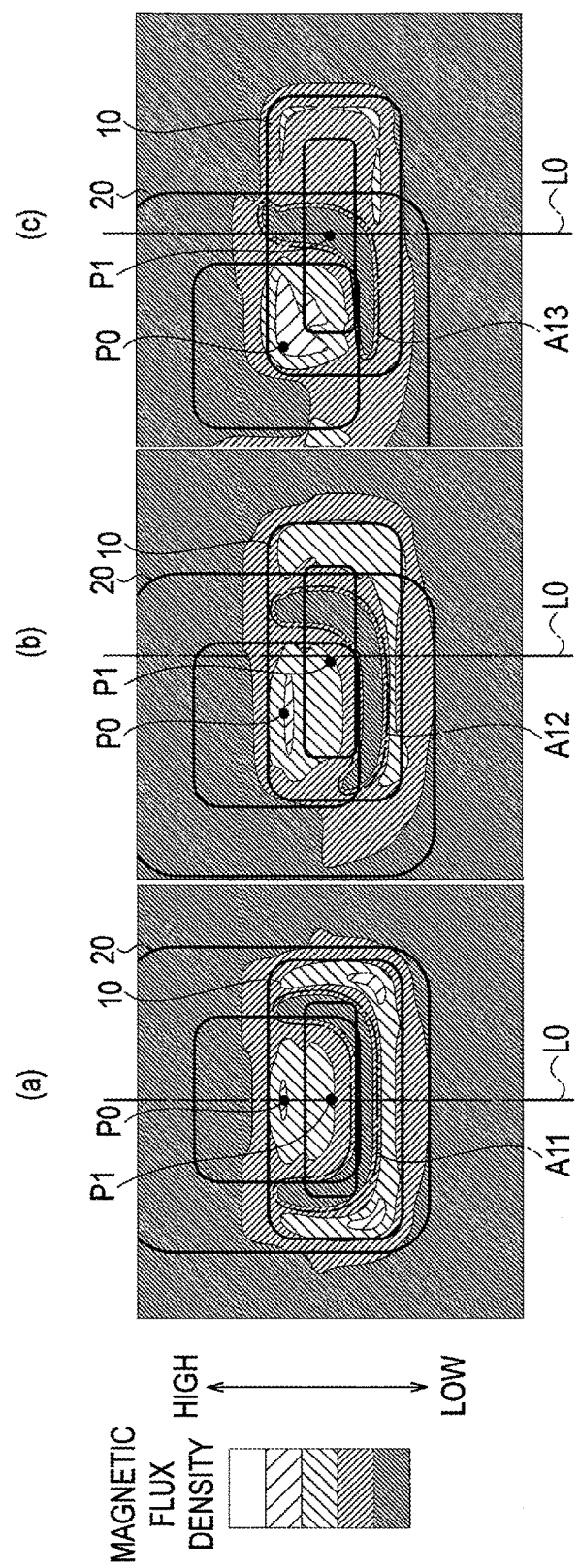

Parts (a) to (c) of FIG. 4 are schematic views illustrating positional relationship between the power receiving coil and the power transmitting coil and the changes in the magnetic flux in a height direction in the first embodiment.

Figure 5:
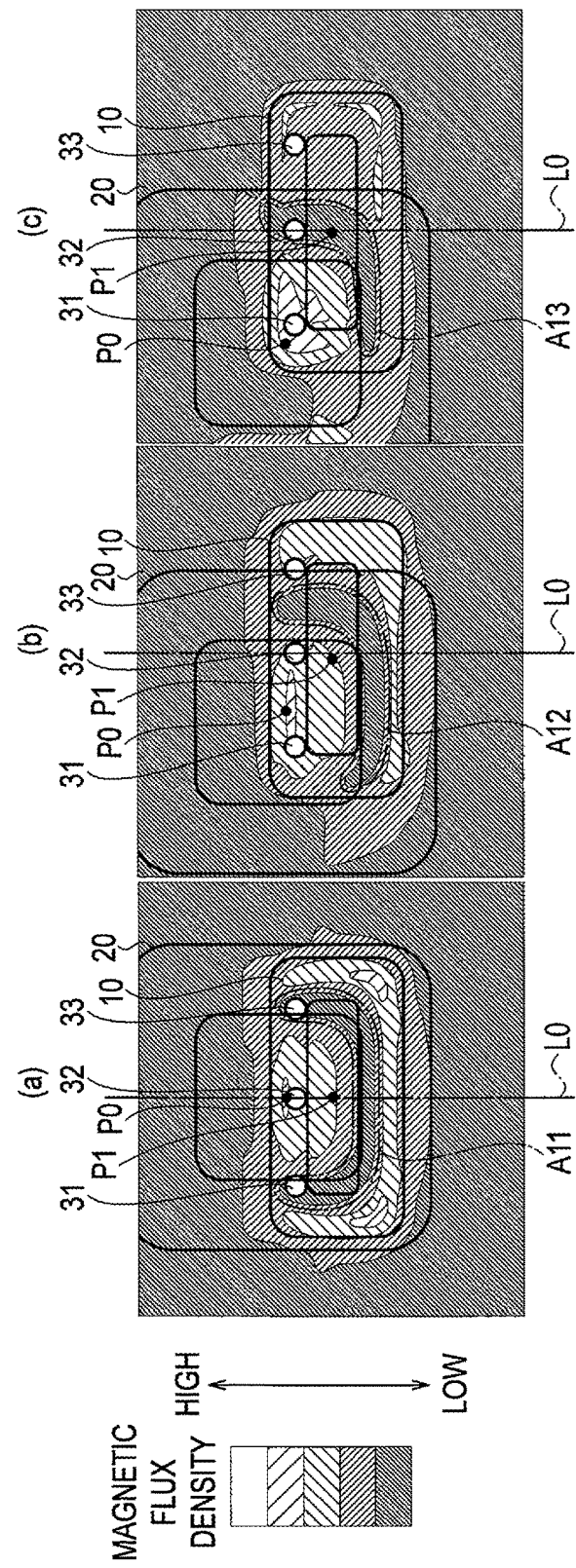

Parts (a) to (c) of FIG. 5 are schematic views illustrating positional relationship among the power receiving coil, sub-coils, and the power transmitting coil and changes in the magnetic flux in the height direction in the first embodiment.

Figure 6:
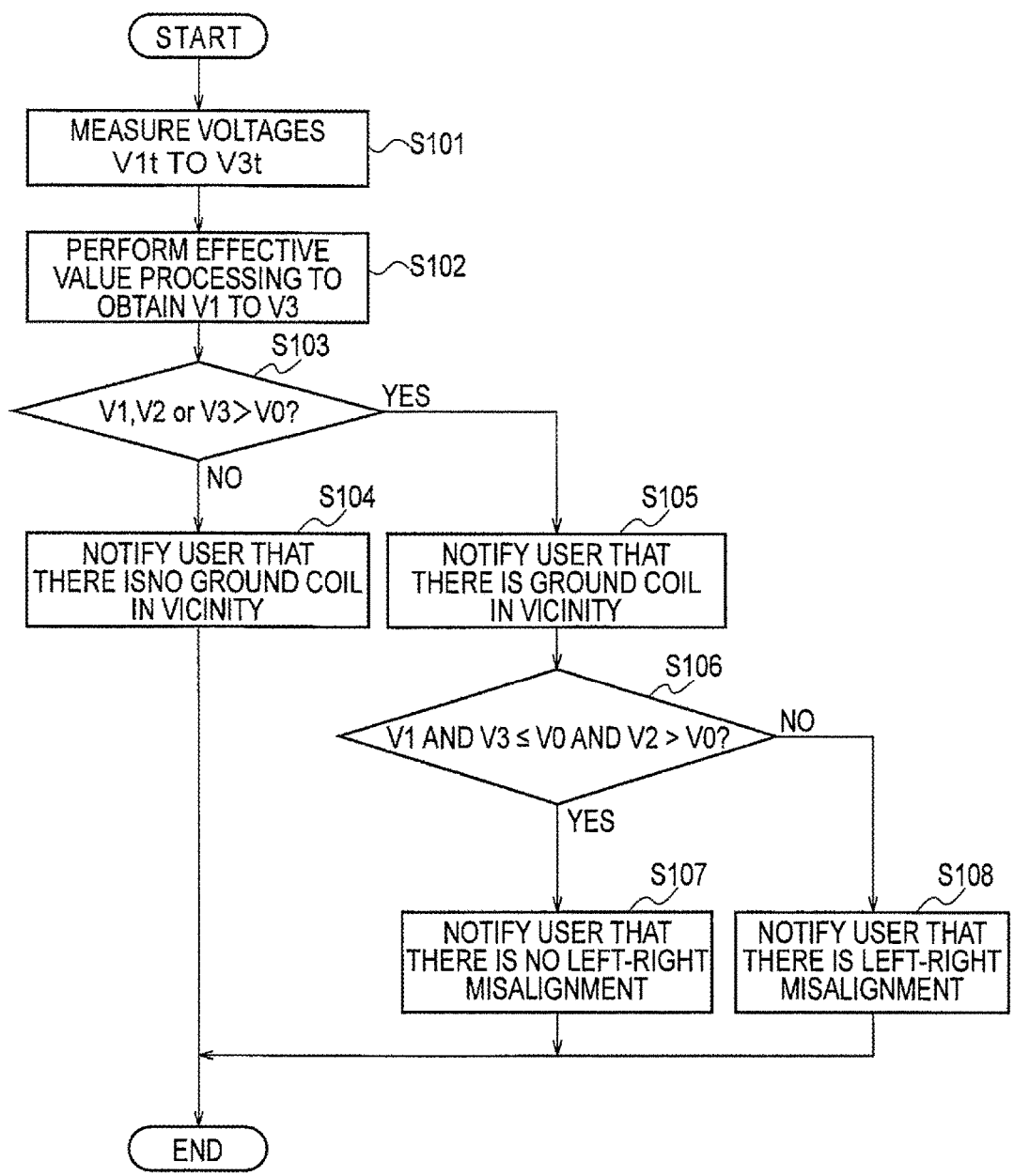

FIG. 6 is a flowchart illustrating an example of a parking assistance method in the first embodiment.

Figure 7:
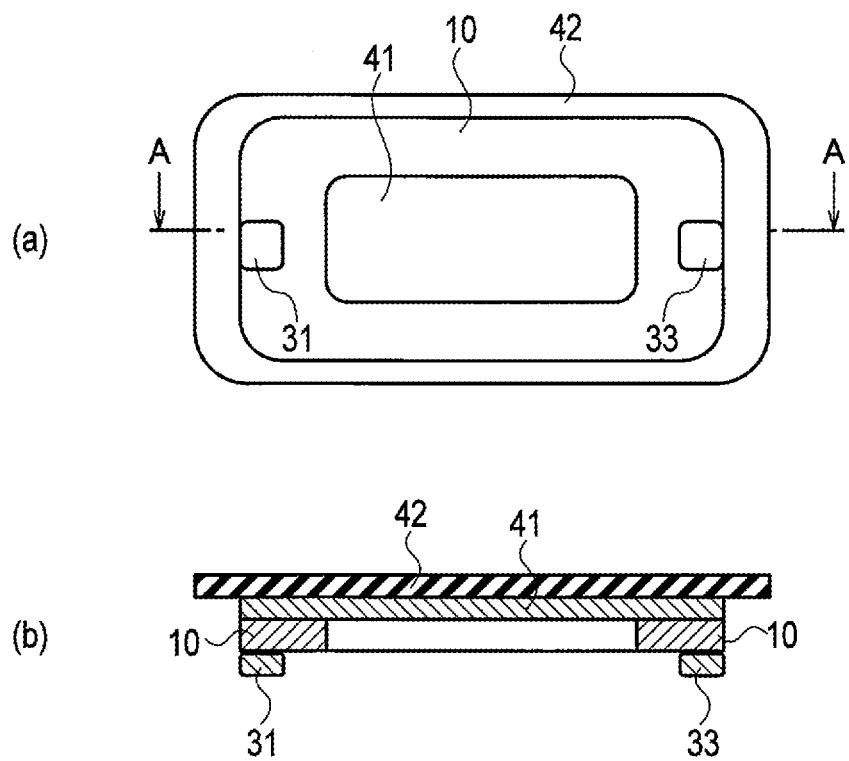

Part (a) of FIG. 7 is a bottom view illustrating an example of the power receiving coil and its vicinity in a first modified example of the first embodiment, and part (b) of FIG. 7 is a cross-sectional view taken along the cross section A-A in part (a) of FIG. 7.

Figure 8:
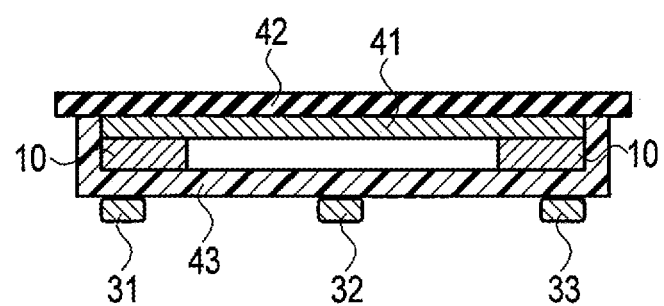

FIG. 8 is a cross-sectional view illustrating an example of the power receiving coil and its vicinity in a second modified example of the first embodiment.

Part (a) of FIG. 9 is a bottom view illustrating an example of the power receiving coil and its vicinity in a second embodiment, and part (b) of FIG. 9 is a cross-sectional view taken along the cross section A-A in part (a) of FIG. 9.

Figure 10:
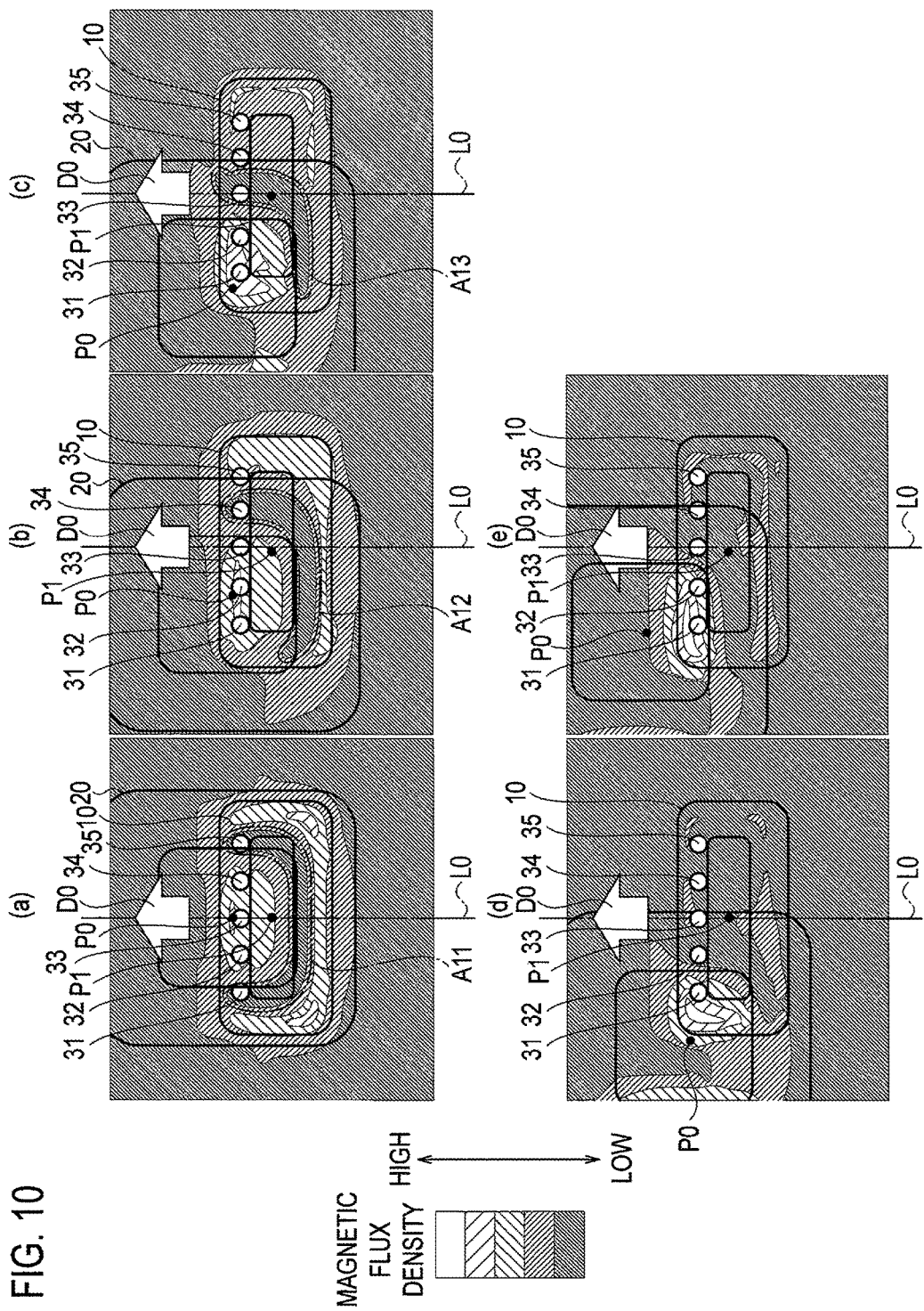

Parts (a) to (e) of FIG. 10 are schematic views illustrating positional relationship among the power receiving coil, sub-coils, and the power transmitting coil and changes in the magnetic flux in the height direction in the second embodiment.

Figure 11:
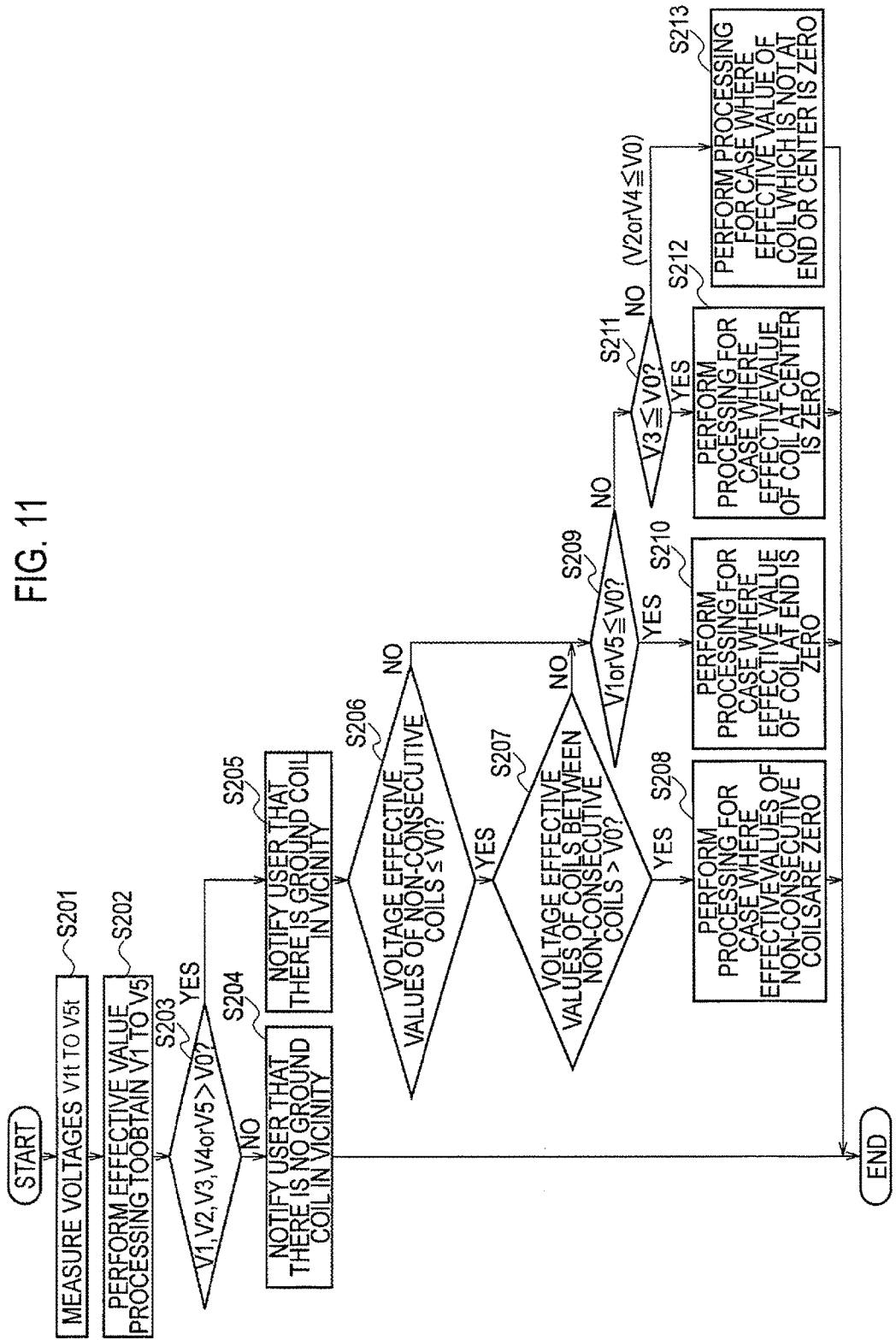

FIG. 11 is a flowchart illustrating an example of a parking assistance method in the second embodiment.

Figure 12:
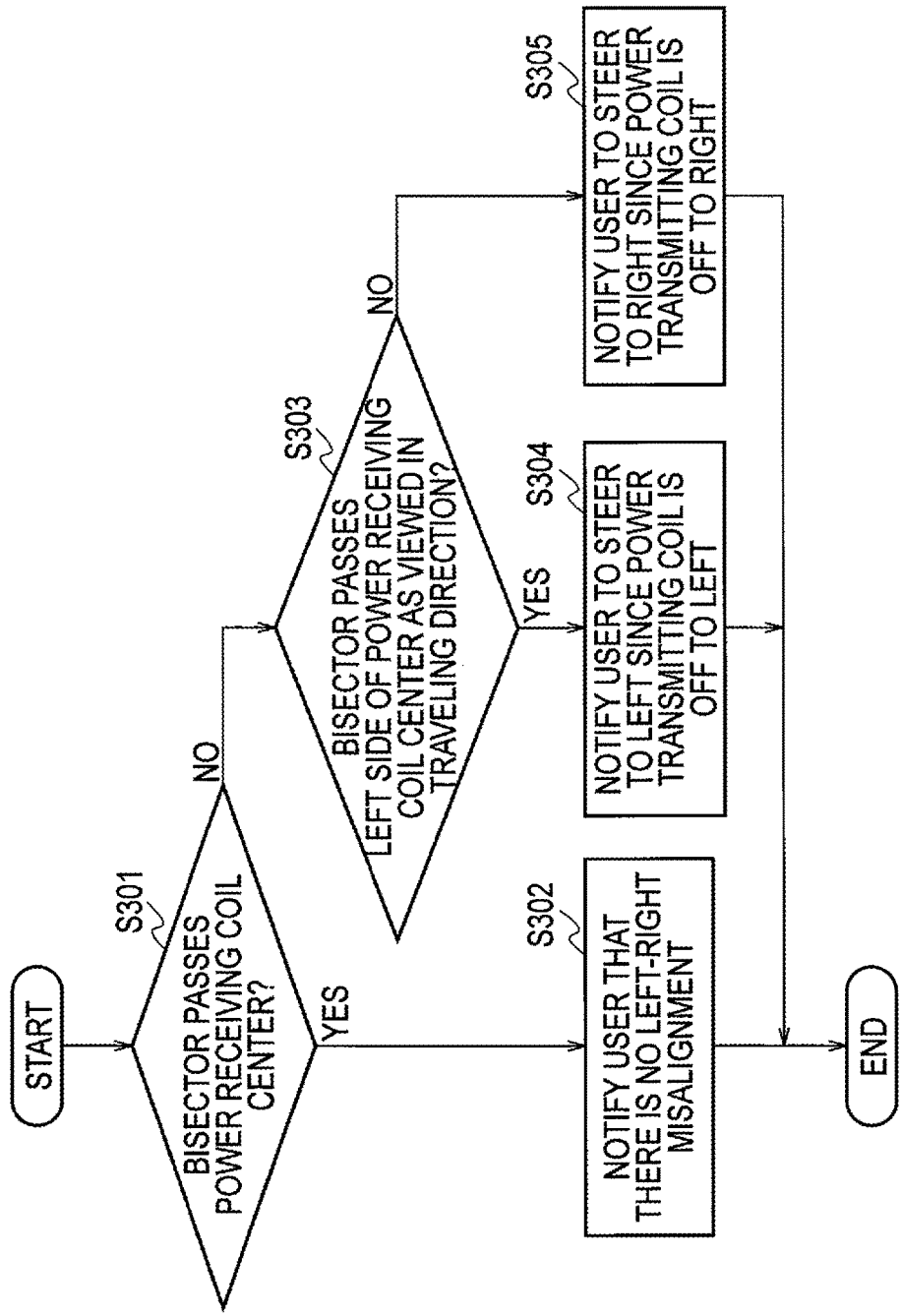

FIG. 12 is a flowchart illustrating details of step S208 in FIG. 11.

Figure 13:
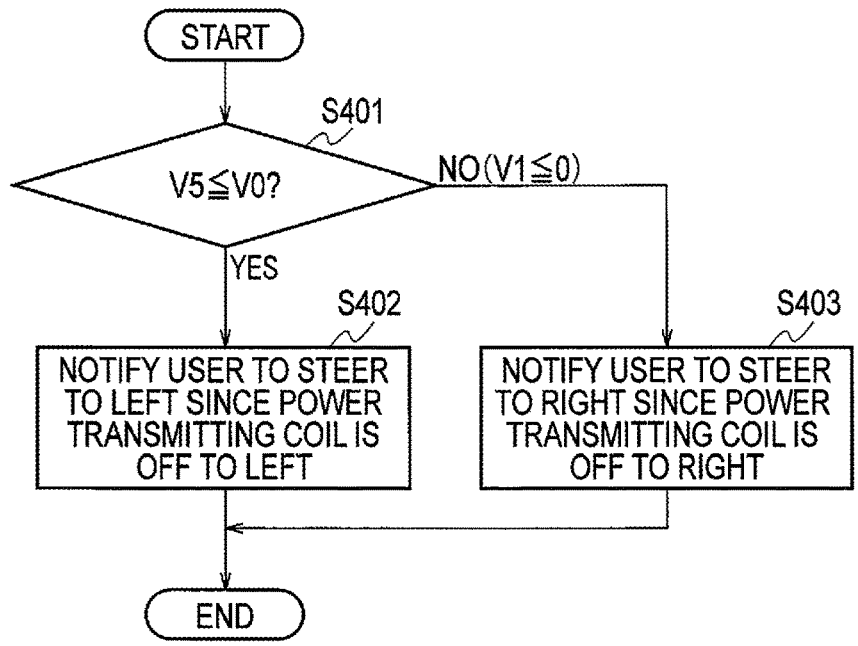

FIG. 13 is a flowchart illustrating details of step S210 in FIG. 11.

Figure 14:
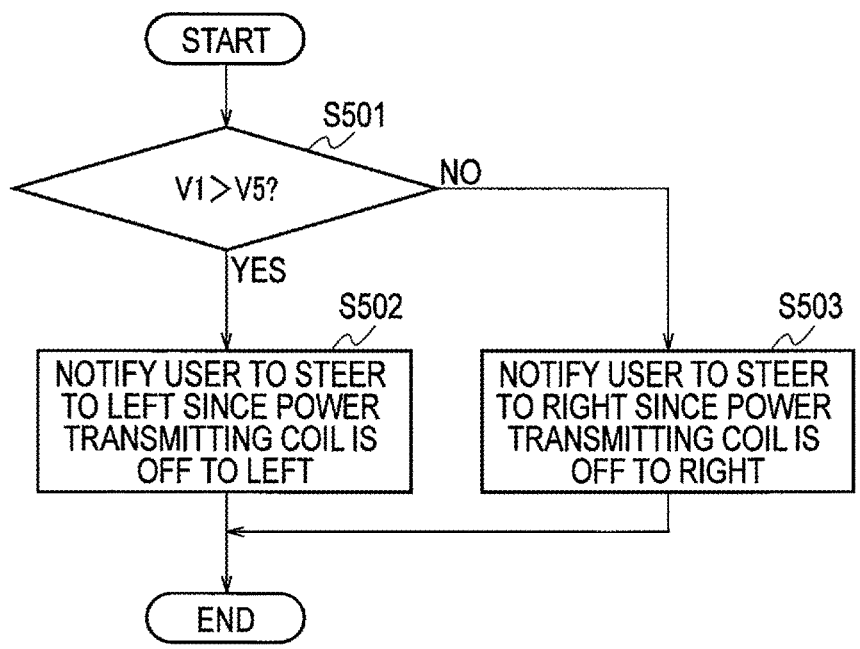

FIG. 14 is a flowchart illustrating details of step S212 in FIG. 11.

Figure 15:
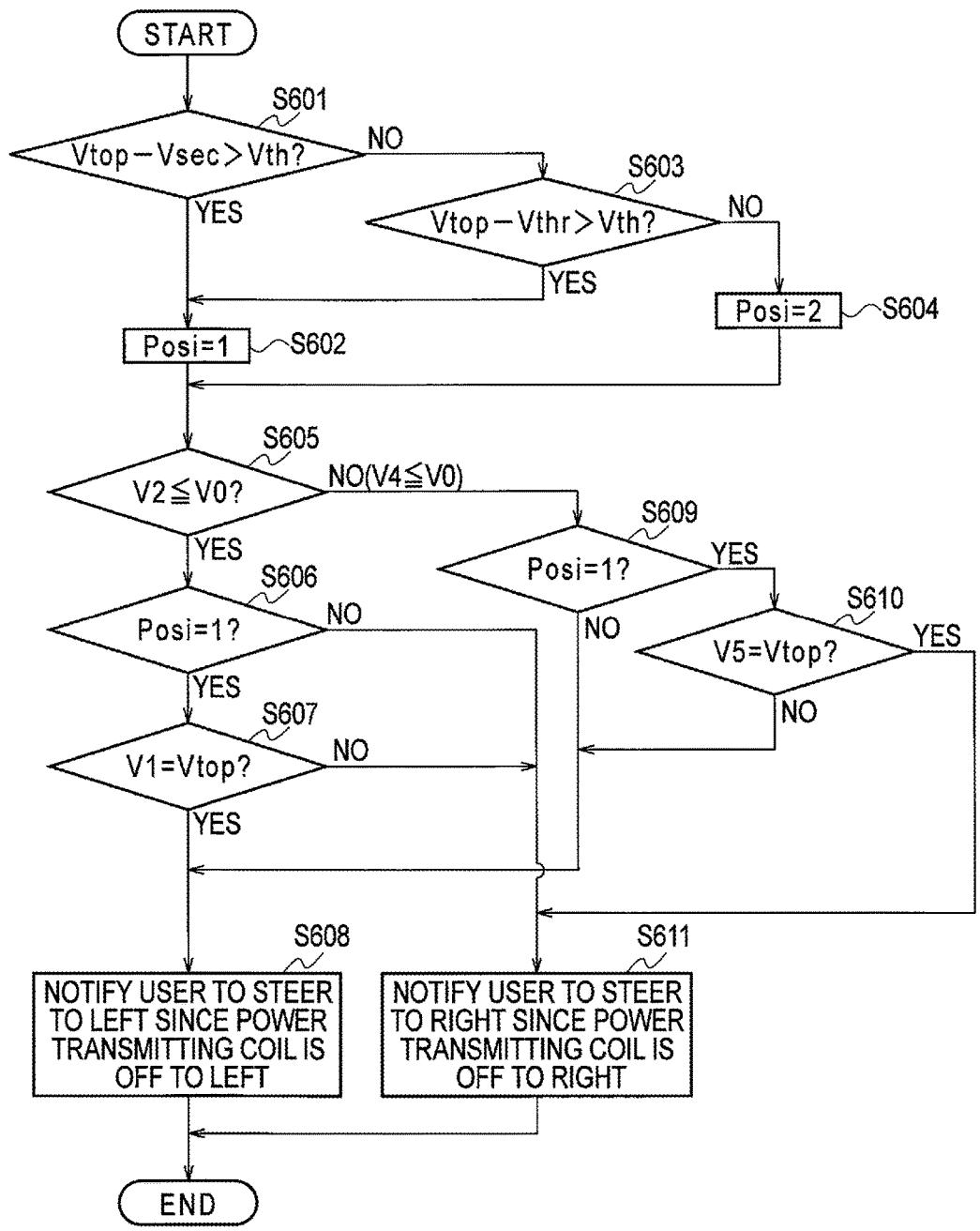

FIG. 15 is a flowchart illustrating details of step S213 in FIG. 11.

DESCRIPTION OF EMBODIMENTS

First and second embodiments are described with reference to the drawings. In the description of the drawings, the same parts are denoted by the same reference numerals and description thereof is omitted.

First Embodiment

Figure 1:
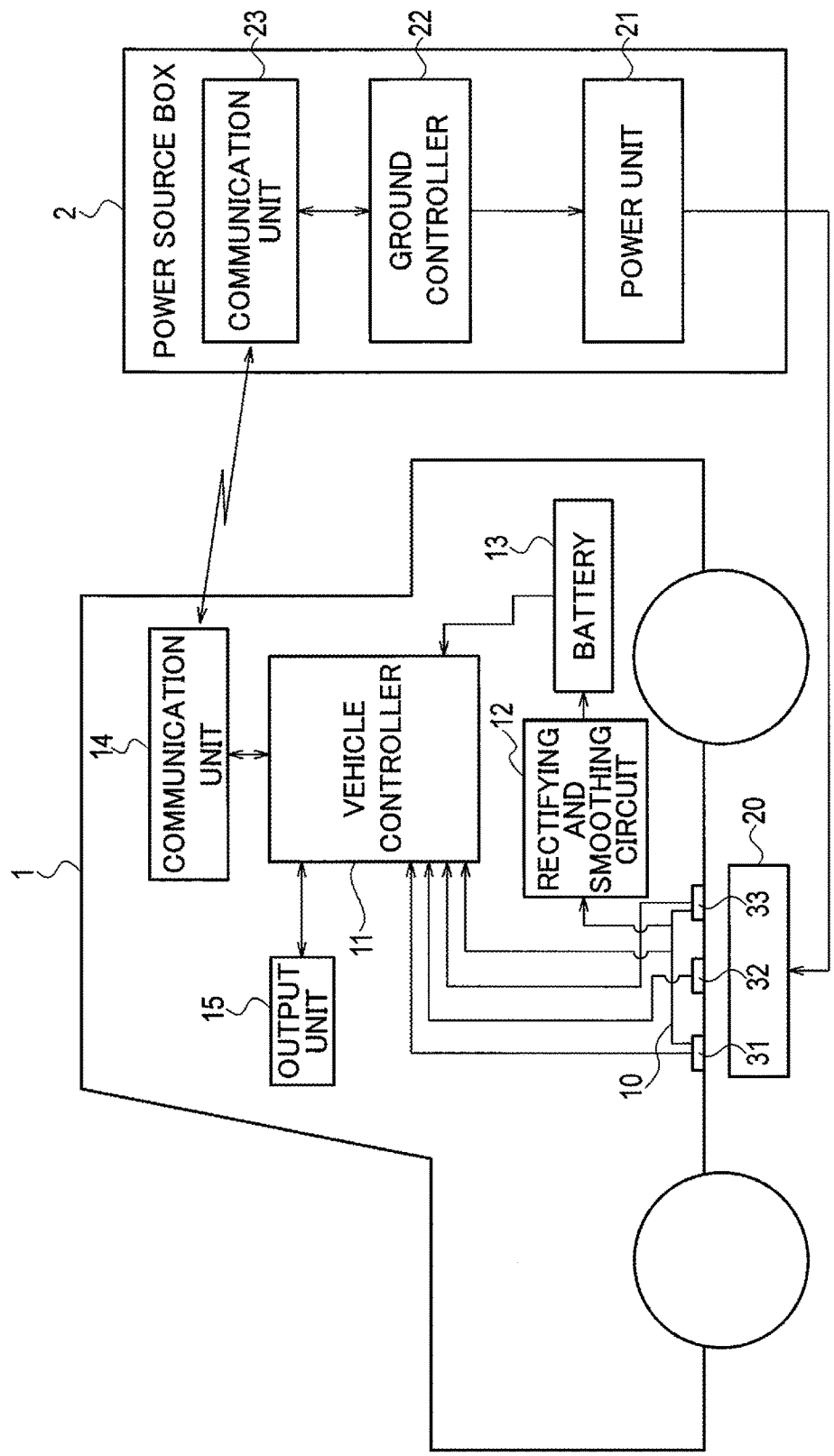
FIG. 1 is a block diagram illustrating an example of a configuration of a parking assistance device in a first embodiment.

A parking assistance device in the first embodiment of the present invention is applied to a wireless power supply system which performs wireless power supply between a power transmitting device including a power transmitting coil 20 on a ground side and a power receiving device including a power receiving coil 10 on a vehicle 1 side as illustrated in FIG. 1. The parking assistance device in the first embodiment of the present invention includes: three coils (sub-coils) 31 to 33 aligned in one direction in a plan view of the vehicle 1, the coils configured to detect magnetic flux in a height direction of the vehicle 1 which is generated by the power transmitting coil 20; and a vehicle controller (misalignment detection unit) 11 configured to detect misalignment between the power transmitting coil 20 and the power receiving coil 10 in the one direction, based on a decrease in the magnetic flux in the height direction of the vehicle 1 which is detected by the three coils (sub-coils) 31 to 33.

The power transmitting device on the ground side includes the power transmitting coil 20 installed on the ground in a parking space or the like and a power source box 2 connected to the power transmitting coil 20. The power source box 2 includes a power unit 21 which excites the power transmitting coil 20 by causing an electric current to flow through the power transmitting coil 20, a ground controller 22 which controls operations of the power unit 21, and a communication unit 23 which wirelessly communicates with the power receiving device on the vehicle 1 side. The ground controller 22 can be formed as an integral computer including, for example, a central processing unit (CPU) and storage units such as a RAM, a ROM, and a hard disk.

The power receiving device on the vehicle 1 side includes the power receiving coil 10, a rectifying and smoothing circuit 12, the vehicle controller 11, a battery (electric load) 13, a communication unit 14, and an output unit (human-machine interface (HMI)) 15. The power receiving coil 10 is arranged at an appropriate position in a bottom portion of the vehicle 1 to face the power transmitting coil 20 when the vehicle 1 is parked at a predetermined position in a parking space. The power receiving coil 10 supplies the received power to the battery 13.

The rectifying and smoothing circuit 12 rectifies and smooths an AC voltage received by the power receiving coil 10. The battery 13 is charged by the voltage received by the power receiving coil 10. The vehicle controller 11 controls operations of the rectifying and smoothing circuit 12. The vehicle controller 11 can be formed as an integral computer including, for example, a central processing unit (CPU) and storage units such as a RAM, a ROM, and a hard disk. The communication unit 14 communicates with the power source box 2. The output unit 15 includes a liquid crystal display of a navigation device or the like, a speaker, a lamp, and the like.

The sub-coils 31 to 33 detect the magnetic flux in the height direction of the vehicle 1 which is generated by the power transmitting coil 20 while the vehicle 1 moves to the predetermined position in the parking space and stops, and output the detected magnetic flux to the vehicle controller 11 as electromagnetic signals.

As illustrated in parts (a) and (b) of FIG. 2, a magnetic member 41 such as ferrite is arranged in an upper portion of the power receiving coil 10, and an upper face of the magnetic member 41 is attached to a case 42. The power receiving coil 10 has, for example, a substantially-rectangle shape, and is annularly wound.

The sub-coils 31 to 33 are arranged in a row in a vehicle width direction on a lower portion of the power receiving coil 10. The sub-coil 32 is arranged at a center position in the vehicle width direction. The two sub-coils 31 and 33 are arranged at equal intervals at positions symmetric to each other with respect to the sub-coil 32. The sub-coils 31 to 33 are arranged on a rear side of the vehicle 1 relative to the center P1 of the power receiving coil 10 (lower side in the sheet of part (a) of FIG. 2). However, the sub-coils 31 to 33 may be arranged on a front side of the vehicle 1 relative to the center P1 of the power receiving coil 10 (upper side in the sheet of part (a) of FIG. 2). The shapes and sizes of the sub-coils 31 to 33 are not limited to particular shapes and sizes as long as the sub-coils can detect the magnetic flux in the height direction of the vehicle 1 which is generated by the power transmitting coil 20.

Next, by using parts (a) to (c) of FIG. 3, description is given of changes in the magnetic flux generated by the power transmitting coil 20 which occur when the power receiving coil 10 comes close to the power transmitting coil 20. Part (a) of FIG. 3 illustrates a state where the power receiving coil 10 is not near the power transmitting coil 20. Part (b) of FIG. 3 illustrates a state where the power receiving coil 10 is near the power transmitting coil 20. Part (c) of FIG. 3 illustrates a state where the power receiving coil 10 is aligned with (faces) the power transmitting coil 20. Note that the power transmitting coil 20 has, for example, a substantially-rectangle (square) shape in the plan view, and is annularly wound.

As illustrated in parts (a) to (c) of FIG. 3, when the power receiving coil 10 comes close to the power transmitting coil 20, the magnetic flux generated by the power transmitting coil 20 is affected by a magnetic field generated by the magnetic member 41 and changes in a complex manner. For example, the magnetic flux in regions A1 and A2 in part (b) of FIG. 3 changes to take a loop route with lower magnetic resistance.

Meanwhile, the magnetic flux in a region A0 above the power transmitting coil 20 illustrated in part (b) of FIG. 3 runs in a loop which does not reach the power receiving coil 10 and short-circuits (U-turns) just below the power receiving coil 10. The magnetic flux in the region A0 runs in a direction toward an outer periphery of the power transmitting coil 20, and the magnetic flux in the height direction (vertical direction) of the vehicle 1 is close to zero. Moreover, the magnetic flux in the region A0 is less affected by the magnetic member 41 when the power receiving coil 10 comes close to the power transmitting coil 20, because a route with low magnetic resistance is already formed. A gap of the magnetic flux in the height direction thus exists above and near an inner portion of the power transmitting coil 20.

Parts (a) to (c) of FIG. 4 illustrate the positional relationship between the power receiving coil 10 and the power transmitting coil 20 and the changes in the magnetic flux in the height direction in a lower portion of the power receiving coil 10 in the first embodiment of the present invention. Part (a) of FIG. 4 illustrates a state where the center P1 of the power receiving coil 10 is aligned with the center P0 of the power transmitting coil 20 in the vehicle width direction and there is no misalignment. Part (b) of FIG. 4 illustrates a state where the power receiving coil 10 is off to the right of the power transmitting coil 20 as viewed in the traveling direction. Part (c) of FIG. 4 illustrates the state where the power receiving coil 10 is further off to the right of the power transmitting coil 20 than in part (b) of FIG. 4 as viewed in the traveling direction. The direction toward the upper side of the sheet of parts (a) to (c) of FIG. 4 is the traveling direction of the vehicle 1. Moreover, a straight line L0 which passes the center P1 of the power receiving coil 10 and which is parallel to the traveling direction of the vehicle 1 is illustrated for convenience in parts (a) to (c) of FIG. 4.

As illustrated in parts (a) to (c) of FIG. 4, regions A11, A12, A13 in which the magnetic flux in the height direction is low exists near a somewhat inner portion of the power transmitting coil 20, even when the positional relationship between the power receiving coil 10 and the power transmitting coil 20 changes. In the first embodiment of the present invention, the fact that a portion of low-level magnetic flux in the height direction exists above and near the somewhat inner portion of the power transmitting coil 20 is utilized to detect the misalignment between the power transmitting coil 20 and the power receiving coil 10.

Positions where the sub-coils 31 to 33 are arranged are appropriately set depending on the shape, size, and the like of the power transmitting coil 20. Parts (a) to (c) of FIG. 5 illustrate examples in which the three sub-coils 31 to 33 are arranged in parts (a) to (c) of FIG. 4. As illustrated in part (a) of FIG. 5, the sub-coil 32 at the center is arranged at such a position that the sub-coil 32 is aligned with the center P0 of the power transmitting coil 20 in the vehicle width direction when the power receiving coil 10 is aligned with the power transmitting coil 20 in the vehicle width direction. Moreover, the sub-coils 31, 33 at both ends are arranged to be near the somewhat inner portion of the power transmitting coil 20, that is to overlap the portion of low-level magnetic flux in the height direction when the power receiving coil 10 is aligned with the power transmitting coil 20.

As illustrated in part (b) of FIG. 5, when the power receiving coil 10 is off to the right of the power transmitting coil 20, all three sub-coils 31 to 33 are located at such positions that the sub-coils 31 to 33 do not overlap the portion of low-level magnetic flux. As illustrated in part (c) of FIG. 5, when the power receiving coil 10 is further off to the right of the power transmitting coil 20, the sub-coil 32 at the center is located at such a position that the sub-coil 32 overlaps the portion of low-level magnetic flux in the height direction, and the sub-coils 31, 33 at both ends are located at such positions that the sub-coils 31, 33 do not overlap the portion of low-level magnetic flux in the height direction.

The vehicle controller (misalignment detection unit) 11 illustrated in FIG. 1 detects the misalignment between the power transmitting coil 20 and the power receiving coil 10 in the alignment direction of the sub-coils 31 to 33 (vehicle width direction), based on the decrease in the magnetic flux in the height detection of the vehicle 1 detected by the three sub-coils 31 to 33. In this case, the vehicle controller 11 performs misalignment detection processing by performing effective value processing on voltages detected by the sub-coils 31 to 33 and thereby obtaining voltages corresponding to the magnetic flux in the height direction.

For example, when the power receiving coil 10 is aligned with the power transmitting coil 20 in the vehicle width direction as illustrated in part (a) of FIG. 5, the vehicle controller 11 determines that the magnetic flux in the height direction detected by each of the sub-coils 31, 33 at both ends is equal to or lower than a first threshold (zero determination threshold) and the magnetic flux in the height direction detected by the sub-coil 32 at the center is higher than a second threshold, and determines that there is no misalignment between the power transmitting coil 20 and the power receiving coil 10 in the vehicle width direction.

In this case, the first threshold (zero determination threshold) is set to distinguish the portion of low-level magnetic flux in the height direction, and is set appropriately depending on the magnetic flux density and the like in the portion of low-level magnetic flux in the height direction. The second threshold is appropriately set to be equal to or higher than the first threshold (specifically, the same value as the first threshold or a higher value than the first threshold). The first and second thresholds are, for example, preset and stored in a memory of the vehicle controller 11.

Meanwhile, when the positional relationship between the power transmitting coil 20 and the power receiving coil 10 is as illustrated in parts (b) and (c) of FIG. 5, the vehicle controller 11 determines that the magnetic flux detected by at least one of the sub-coils 31, 33 at both ends is higher than the first threshold (zero determination threshold), and determines that there is misalignment between the power transmitting coil 20 and the power receiving coil 10 in the vehicle width direction. Moreover, when the positional relationship between the power transmitting coil 20 and the power receiving coil 10 is as illustrated in part (c) of FIG. 5, the vehicle controller 11 determines that the magnetic flux detected by the sub-coil 32 at the center is lower than the second threshold, and determines that there is misalignment between the power transmitting coil 20 and the power receiving coil 10.

The output unit 15 illustrated in FIG. 1 notifies the user of the detection results such as presence or absence of the misalignment between the power transmitting coil 20 and the power receiving coil 10 and the direction of the misalignment which are detected by the vehicle controller 11, by displaying images, outputting voices, and performing similar operations. The user notified by the output unit 15 can recognize the presence or absence of the misalignment between the power transmitting coil 20 and the power receiving coil 10, the direction of the misalignment, and the like.

Next, an example of a parking assistance method (misalignment detection method) in the first embodiment of the present invention is described with reference to the flowchart of FIG. 6.

In step S101, when the vehicle 1 comes close to a parking space, the sub-coils 31 to 33 detect voltages V1$t$ to V3$t$ and output them to the vehicle controller 11 as electromagnetic signals. In step S102, when excitation is received from the ground side, the vehicle controller 11 performs the effective value processing on the voltages V1$t$ to V3$t$ and obtains voltages V1 to V3 corresponding to the magnetic flux in the height direction.

In step S103, the vehicle controller 11 determines whether at least one of the voltages V1 to V3 is higher than the zero determination threshold V0. When the voltages V1 to V3 are all determined to be equal to or lower than the zero determination threshold V0, the processing proceeds to step S104 and the output unit 15 notifies the user that there is no power transmitting coil 20 near the power receiving coil 10. Meanwhile, when the vehicle controller 11 determines that at least one of the voltages V1 to V3 is higher than the zero determination threshold in step S103, the processing proceeds to step S105 and the output unit 15 first notifies the user that the power transmitting coil 20 is near the power receiving coil 10.

In step S106, the vehicle controller 11 determines whether the voltages V1, V3 are equal to or lower than the zero determination threshold (first threshold) V0, and also determines whether the voltage V2 is equal to or higher than the zero determination threshold (second threshold) V0. For example, when the positional relationship is as illustrated in part (a) of FIG. 5 and the vehicle controller 11 thus determines that the voltages V1, V3 are equal to or lower than the zero determination threshold V0 and determines that the voltage V2 is higher than the zero determination threshold V0, the processing proceeds to step S107. In step S107, the output unit 15 notifies the user that the power receiving coil 10 is aligned with the power transmitting coil 20 (there is no misalignment) in the vehicle width direction.

Meanwhile, for example, when the positional relationship is as illustrated in part (b) or (c) of FIG. 5 and the vehicle controller 11 thus determines that at least one of the voltages V1, V3 is higher than the zero determination threshold V0, or when the positional relationship is as illustrated in part (c) of FIG. 5 and the vehicle controller 11 thus determines that the voltage V2 is equal to or lower than the zero determination threshold V0, the processing proceeds to step S108. In step S108, the output unit 15 notifies the user that there is misalignment between the power receiving coil 10 and the power transmitting coil 20 in the vehicle width direction.

As described above, in the first embodiment of the present invention, the misalignment is detected based on the decrease in the magnetic flux in the height direction by utilizing the short-circuit phenomenon of the magnetic flux above and near the somewhat inner portion of the power transmitting coil 20. This enables detection of the misalignment between the power transmitting coil 20 and the power receiving coil 10 with a low-cost configuration.

Moreover, at least three sub-coils 31 to 33 are arranged in the vehicle width direction to detect the misalignment. This enables detection of the misalignment in the vehicle width direction. Furthermore, the sub-coils 31 to 33 are aligned in the vehicle width direction at positions on the front side or the rear side of the vehicle 1 relative to the center of the power receiving coil 10 below the power receiving coil 10. This enables early detection of the misalignment in the vehicle width direction when the vehicle 1 enters the parking position from the side where the sub-coils 31 to 33 are aligned.

First Modified Example

In the first embodiment of the present invention, description is given of the case where the magnetic flux in the height direction is detected by utilizing the three sub-coils 31 to 33. Meanwhile, as a first modified example of the present invention, description is given of the case where the misalignment is detected by utilizing the power receiving coil 10 instead of the sub-coil 32 at the center.

In the first modified example, as illustrated in parts (a) and (b) of FIG. 7, the two sub-coils 31, 33 are aligned respectively on both sides of the power receiving coil 10 in a row in the vehicle width direction. The power receiving coil 10 has a function of receiving power from the power transmitting coil 20 and also has a function similar to that of the sub-coil 32 at the center in the first embodiment. Specifically, the power receiving coil 10 detects the magnetic flux in the height direction generated by the power transmitting coil 20 and outputs the magnetic flux to the vehicle controller 11 as the electromagnetic signal.

In the first modified example, the magnetic flux in the height direction is detected by utilizing the power receiving coil 10 together with the two sub-coils 31, 33. This enables detection of the presence or absence of the misalignment as in the first embodiment while reducing the number of sub-coils 31, 33 for detecting the magnetic flux in the height direction.

Second Modified Example

In the first embodiment of the present invention, description is given of the case where the sub-coils 31 to 33 are arranged in contact with the lower portion of the power receiving coil 10. Meanwhile, as a second modified example of the present invention, description is given of the case where the sub-coils 31 to 33 are not in contact with the power receiving coil 10.

In the second modified example of the present invention, as illustrated in FIG. 8, the sub-coils 31 to 33 are arranged on a lower face of a resin coil cover 43 covering the power receiving coil 10. As the sub-coils 31 to 33, it is possible to attach wires or use conductive coil patterns such as printed circuit boards.

In the second modified example, the sub-coils 31 to 33 do not have to be in contact with the power receiving coil 10 and only need to be arranged at positions which are near the lower portion of the power receiving coil 10 and at which the sub-coils 31 to 33 can detect the decrease of the magnetic flux in the height direction generated by the power transmitting coil 20.

Second Embodiment

As a second embodiment of the present invention, description is given of the case where five coils for detecting the magnetic flux in the height direction are aligned to detect the direction of the misalignment. A parking assistance device in the second embodiment of the present invention includes five sub-coils 31 to 35 as illustrated in parts (a) and (b) of FIG. 9.

The sub-coils 31 to 35 are arranged in a row in the vehicle width direction in a plan view of the vehicle 1. The sub-coils 31 to 35 may be arranged on the rear side of the vehicle 1 relative to the center P1 of the power receiving coil 10 or arranged on the front side of the vehicle 1 relative to of the center P1. The sub-coils 31 to 35 are arranged, for example, at equal intervals. The sub-coil 33 at the center is arranged to be aligned with the center P1 of the power receiving coil 10 in the vehicle width direction. The sub-coils 32, 34 are arranged at positions symmetric to each other with respect to the sub-coil 33 at the center. The sub-coils 31, 35 at both ends are arranged at positions symmetric to each other with respect to a set of the sub-coils 32 to 34.

The positions where the sub-coils 31 to 35 are arranged are appropriately set depending on the size, shape, and the like of the power transmitting coil 20. In the second embodiment of the present invention, the sub-coils 31, 35 at both ends are arranged to be in the portion of low-level magnetic flux in the height direction when the power receiving coil 10 is aligned with the power transmitting coil 20 in the vehicle width direction. Note that the sub-coils 31, 35 at both ends do not necessarily have to be arranged in the portion of low-level magnetic flux in the height direction and, for example, one sub-coil may be further arranged outside each of the sub-coils 31, 35.

Parts (a) to (e) of FIG. 10 illustrate the positional relationship between the power transmitting coil 20 and the power receiving coil 10, changes in the magnetic flux in the height direction, and an arrangement example of the sub-coils 31 to 35. In parts (a) to (e) of FIG. 10, the arrow DO indicates the traveling direction of the vehicle 1, and the straight line L0 is a straight line which passes the center P1 of the power receiving coil 10 and which is parallel to the traveling direction of the vehicle 1.

As illustrated in part (a) of FIG. 10, when the power receiving coil 10 is aligned with the power transmitting coil 20 in the vehicle width direction, the sub-coils 31, 35 at both ends are arranged to be in the portion of low-level magnetic flux. Parts (b) to (e) of FIG. 10 illustrate states where the power receiving coil 10 is off to the right of the power transmitting coil 20. In part (b) of FIG. 10, the sub-coil 34 which is second from the right overlaps the portion of low-level magnetic flux and, in part (c) of FIG. 10, the sub-coil 33 at the center overlaps the portion of low-level magnetic flux.

In the second embodiment of the present invention, the vehicle controller 11 illustrated in FIG. 1 detects, in addition to the presence and absence of the misalignment, the direction of the misalignment while using the portion of low-level magnetic flux detected by the five sub-coils 31 to 35 as an origin. Since the other configurations are the same as those in the first embodiment, overlapping description is omitted.

Next, an example of a parking assistance method (misalignment detection method) in the second embodiment of the present invention is described with reference to the flowcharts of FIGS. 11 to 15.

In step S201, the five sub-coils 31 to 35 measure voltages V1$t$ to V5$t$ and output them to the vehicle controller 11. In step S202, when excitation is received from the ground side, the vehicle controller 11 performs the effective value processing on the voltages V1$t$ to V5$t$ of the sub-coils 31 to 35 and obtains voltages V1 to V5 corresponding to the magnetic flux in the height direction.

In step S203, the vehicle controller 11 determines whether at least one of the voltages V1 to V5 is higher than the zero determination threshold V0. Note that the zero determination threshold V0 is appropriately set to such a value that the portion of low-level magnetic flux can be distinguished. When the voltages V1 to V5 are all determined to be equal to or lower than the zero determination threshold V0 (determined to be zero), processing proceeds to step S204 and the output unit 15 notifies the user that there is no power transmitting coil 20 near the power receiving coil 10. Meanwhile, when the vehicle controller 11 determines that at least one of the voltages V1 to V5 is higher than the zero determination threshold V0 in step S203, the processing proceeds to step S205 and the output unit 15 notifies the user that the power receiving coil 10 is near the power transmitting coil 20.

In step S206, the vehicle controller 11 determines whether voltages corresponding to two non-consecutive sub-coils out of the voltages V1 to V5 are equal to or lower than the zero determination threshold V0. For example, when the positional relationship is as illustrated in part (a) of FIG. 10 and the voltages V1, V5 corresponding to the non-consecutive sub-coils 31, 35 at both ends out of the voltages V1 to V5 are thus determined to be equal to or lower than the zero determination threshold V0 (determined to be zero), the processing proceeds to step S207.

In step S207, the vehicle controller 11 determines whether the voltages V2 to V4 of the sub-coils 32 to 34 between the sub-coils 31, 35 determined to be zero are higher than the zero determination threshold V0. When the voltages of the sub-coils 32 to 34 between the sub-coils 31, 35 determined to be zero are determined to be higher than the zero determination threshold V0, the center P0 of the power transmitting coil 20 is determined to be on a bisector of a line segment whose endpoints are at the two sub-coils 31, 35 determined to be zero, and the processing proceeds to step S208.

Details of step S208 are described with reference to the flowchart of FIG. 12. In step S301, the vehicle controller 11 determines whether the bisector of the line segment whose endpoints are at the two sub-coils 31, 35 determined to be zero passes the center P1 of the power receiving coil 10. For example, when the positional relationship is as illustrated in part (a) of FIG. 10 and the bisector (coinciding with the straight line L0) is thus determined to pass the center P1 of the power receiving coil 10, the processing proceeds to step S302 and the output unit 15 notifies the user that there is no left-right misalignment between the power transmitting coil 20 and the power receiving coil 10 in the vehicle width direction.

Meanwhile, when the vehicle controller 11 determines that the bisector of the line segment whose endpoints are at the two sub-coils 31, 35 determined to be zero does not pass the center P1 of the power receiving coil 10 in step S301, the processing proceeds to step S303. In step S303, the vehicle controller 11 determines whether the bisector passes the left side of the center P1 of the power receiving coil 10 as viewed in the traveling direction. When the bisector is determined to pass the left side of the center P1 of the power receiving coil 10 as viewed in the traveling direction, the processing proceeds to step S304 and the output unit 15 notifies the user to steer to the left since the power transmitting coil 20 is off to the left. Meanwhile, when the bisector is determined to pass the right side of the center P1 of the power receiving coil 10 as viewed in the traveling direction, the processing proceeds to step S305 and the output unit 15 notifies the user to steer to the right since the power transmitting coil 20 is off to the right.

Returning to FIG. 11, when no voltages corresponding to two non-consecutive sub-coils out of the voltages V1 to V5 are equal to or lower than the zero determination threshold V0 in step S206 or when the voltages of the sub-coils between the sub-coils determined to be zero are determined to be equal to or lower than the zero determination threshold V0 in step S207, the processing proceeds to step S209.

In step S209, the vehicle controller 11 determines whether one of the voltages V1, V5 of the sub-coils 31, 35 at both ends is equal to or lower than the zero determination threshold V0. When one of the voltages V1, V5 is determined to be equal to or lower than the zero determination threshold V0 (determined to be zero), the processing proceeds to step S210.

Details of step S210 are described with reference to the flowchart of FIG. 13. In step S401, the vehicle controller 11 determines whether the voltage V5 is equal to or lower than the zero determination threshold V0. For example, when the positional relationship is as illustrated in part (d) or (e) of FIG. 10 and the voltage V5 is thus determined to be equal to or lower than the zero determination threshold V0, the processing proceeds to step S402. In step S402, since the power transmitting coil 20 is off to the left as viewed in the traveling direction of the vehicle 1, the output unit 15 notifies the user to steer to the left.

Meanwhile, when the voltage V5 is determined to be higher than the zero determination threshold V0 (in other words, the voltage V1 is determined to be equal to or lower than the zero determination threshold V0) in step S401, the processing proceeds to step S403. In step S403, since the power transmitting coil 20 is off to the right as viewed in the traveling direction of the vehicle 1, the output unit 15 notifies the user to steer to the right.

Returning to FIG. 11, when neither of the voltages V1, V5 of the sub-coils 31, 35 at both ends are determined to be zero in step S209, the processing proceeds to step S211. In step S211, the vehicle controller 11 determines whether the voltage V3 of the sub-coil 33 at the center is equal to or lower than the zero determination threshold V0. When the voltage V3 is determined to be equal to or lower than the zero determination threshold V0 (determined to be zero), the processing proceeds to step S212.

Details of step S212 are described with reference to the flowchart of FIG. 14. In step S501, the vehicle controller 11 compares the voltages V1, V5 of the sub-coils 31, 35 at both ends and determines that the power transmitting coil 20 is off to the side of the sub-coil with the higher voltage. For example, when the positional relationship is as illustrated in part (c) of FIG. 10 and the voltage V1 is determined to be higher than the voltage V5, the processing proceeds to step S502 and the output unit 15 notifies the user to steer to the left since the power transmitting coil 20 is off to the left as viewed in the traveling direction of the vehicle 1.

Meanwhile, when the voltage V1 is determined to be equal to or lower than the voltage V5 in step S501, the processing proceeds to step S503 and the output unit 15 notifies the user to steer to the right since the power transmitting coil 20 is off to the right as viewed in the traveling direction of the vehicle 1.

Returning to FIG. 11, when the voltage V3 of the sub-coil 33 at the center is determined to be higher than the zero determination threshold V0 in step S211, one of the voltages V2, V4 of the sub-coils 32, 34 which are not at the center or the ends is equal to or lower than the zero determination threshold V0, and the processing thus proceeds to step S213.

Details of step S213 are described with reference to the flowchart of FIG. 15. Note that, out of the voltages V1 to V5, the highest voltage is referred to as "Vtop," the second highest voltage is referred to as "Vsec," and the third highest voltage is referred to as "Vthr."

In step S601, the vehicle controller 11 determines whether a voltage difference Vtop−Vsec between the highest voltage Vtop and the second highest voltage Vsec is higher than a predetermined threshold Vth. When the voltage difference Vtop−Vsec is higher than the predetermined threshold Vth, the processing proceeds to step S602 and the vehicle controller 11 determines that the power transmitting coil 20 is off to the side of the sub-coil with the highest voltage Vtop (referred to as Posi=1). Meanwhile, when the voltage difference Vtop−Vsec is equal to or lower than the predetermined threshold Vth in step S601, the processing proceeds to step S603.

In step S603, the vehicle controller 11 determines whether a voltage difference Vtop−Vthr between the highest voltage Vtop and the third highest voltage Vthr is higher than the predetermined threshold Vth. When the voltage difference Vtop−Vthr is determined to be higher than the predetermined threshold Vth, the processing proceeds to step 602 and the vehicle controller 11 determines that the power transmitting coil 20 is off to the side of the sub-coil with the highest voltage Vtop (Posi=1). Meanwhile, when the voltage difference Vtop−Vthr is determined to be equal to or lower than the predetermined threshold Vth in step S603, the processing proceeds to step S604 and the vehicle controller 11 determines that the coil is off to the side of the sub-coil with the third highest voltage Vthr (referred to as "Posi=2").

In step S605, the vehicle controller 11 determines whether the voltage V2 is equal to or lower than the zero determination threshold V0. When the voltage V2 is determined to be equal to or lower than the zero determination threshold V0 (determined to be zero), the processing proceeds to step S606 and the vehicle controller 11 determines whether the determination result in step S602 is "Posi=1." The processing proceeds to step S607 when the determination result is "Posi=1" and proceeds to step S611 when the determination result is "Posi=2." In step S607, the processing proceeds to step S608 when the voltage V1 is the highest voltage Vtop and proceeds to step S611 when the voltage V1 is not the highest voltage Vtop.

When the voltage V2 is determined to be higher than the zero determination threshold V0 (in other words, the voltage V4 is determined to be equal to or lower than the zero determination threshold V0) (determined to be zero) in step S605, the processing proceeds to step S609. In step S609, the processing proceeds to step S610 when the determination result is "Posi=1" and proceeds to step S608 when the determination result is "Posi=2." In step S610, the processing proceeds to step S611 when the voltage V5 is the highest voltage Vtop and proceeds to step S608 when the voltage V5 is not the highest voltage Vtop.

In step S608, since the power transmitting coil 20 is off to the left as viewed in the traveling direction of the vehicle 1, the output unit 15 notifies the user to steer to the left. In step S611, since the power transmitting coil 20 is off to the right as viewed in the traveling direction of the vehicle 1, the output unit 15 notifies the user to steer to the right.

As described above, in the second embodiment of the present invention, five or more sub-coils 31 to 35 are used to detect the magnetic flux in the height direction, and the vehicle controller 11 detects the misalignment, based on the magnetic flux detected by the five or more sub-coils 31 to 35. This enables detection of not only the presence or absence of misalignment but also the direction of the misalignment.

Moreover, at least five sub-coils 31 to 35 are arranged in the vehicle width direction to detect the misalignment. This enables detection of the direction of the misalignment in the vehicle width direction. Moreover, the sub coils 31 to 35 are aligned in the vehicle width direction at positions on the front side or the rear side of the vehicle 1 relative to the center of the power receiving coil 10 in the vehicle 1 below the power receiving coil 10. This enables early detection of the misalignment in the vehicle width direction when the vehicle 1 enters the parking position from the side where the sub-coils 31 to 35 are arranged.

OTHER EMBODIMENTS

Although the embodiments of the present invention are described above, it should not be understood that the description and drawings forming part of this disclosure limit the present invention. From this disclosure, various alternative embodiments, examples, and operations techniques will be found by those skilled in the art.

For example, in the first and second embodiments of the present invention, description is given of the case of using the three sub coils 31 to 33, the combination of sub-coils 31, 33 and the power receiving coil 10, or the five sub-coils 31 to 35. However, the parking assistance device may use four, six or more sub-coils or a combination of these sub-coils and the power receiving coil to detect the magnetic flux in the height direction, and detect the presence or absence of the misalignment and the direction of the misalignment, based on the decrease of the magnetic flux in the height direction. Using more coils for detection enables more accurate detection of the presence or absence of the misalignment and the direction of the misalignment.

Moreover, in the first and second embodiments of the present invention, description is given of the case where the three sub coils 31 to 33, the combination of sub-coils 31, 33 and the power receiving coil 10, or the five sub-coils 31 to 35 are arranged in a row in the vehicle width direction. However, the alignment direction of the coils is not limited particularly to the vehicle width direction. For example, misalignment in the traveling direction of the vehicle 1 can be detected by arranging multiple sub-coils in a row in the traveling direction of the vehicle 1. Moreover, the misalignment in both of the vehicle width direction and the traveling direction of the vehicle 1 can be detected by arranging multiple coils in the vehicle width direction and the traveling direction of the vehicle 1.

In the first and second embodiments of the present invention, the battery 13 is described as an example of an electric load. However, the electric load in the present invention is not limited to this and may be, for example, an electric motor.

REFERENCE SIGNS LIST 1 vehicle
2 power source box
10 power receiving coil (vehicle coil)
11 vehicle controller (misalignment detection unit)
12 rectifying and smoothing circuit
13 battery (electric load)
14, 23 communication unit
15 output unit (HMI)
20 power transmitting coil (ground coil)
21 power unit
22 ground controller
31 to 35 sub-coils
41 magnetic member
42 case
43 coil cover

The invention claimed is:

1. A parking assistance device used in a wireless power supply system which performs wireless power supply between a power transmitting coil on a ground side and a power receiving coil on a vehicle side, the parking assistance device comprising:
three or more coils aligned in one direction in a plan view of the vehicle, the coils being configured to detect magnetic flux in a height direction of the vehicle which is generated by the power transmitting coil;
a vehicle controller configured to detect misalignment between the power transmitting coil and the power receiving coil in the one direction, based on a decrease in the magnetic flux in the height direction of the vehicle which is detected by the three or more coils; and
an output unit configured to notify a user of a result of the misalignment detection.

2. The parking assistance device according to claim 1, wherein
the three or more coils include a first coil, a second coil, and a third coil, the second and third coils being arranged at positions symmetric to each other with respect to the first coil in a vehicle width direction;
the vehicle controller is further configured to
determine that misalignment is absent when the magnetic flux detected by each of the second and third coils is equal to or lower than a first threshold and the magnetic flux detected by the first coil is higher than a second threshold,
determine that misalignment is present when the magnetic flux detected by at least one of the second and third coils is higher than the first threshold, and
determine that misalignment is present when the magnetic flux detected by the first coil is equal to or smaller than the second threshold.

3. The parking assistance device according to claim 2, wherein the first to third coils are sub-coils aligned in the vehicle width direction at positions on a front side or a rear side of the vehicle relative to a center of the power receiving coil below the power receiving coil.

4. The parking assistance device according to claim 2, wherein
the first coil is the power receiving coil, and
the second and third coils are sub-coils arranged at positions symmetric to each other with respect to a center of the power receiving coil in the vehicle width direction, below the power receiving coil.

5. The parking assistance device according to claim 1, wherein
the three or more coils are five or coils, and
the vehicle controller is further configured to detect a direction of misalignment, based on magnetic flux detected by the five or more coils.

6. The parking assistance device according to claim 1, wherein the vehicle controller is further configured to
detect a short-circuit phenomenon of the magnetic flux above an inner portion of the power transmitting coil based on the decrease in the magnetic flux, and
detect misalignment based on the short-circuit phenomenon.

7. The parking assistance device according to claim 1, wherein
the three or more coils include a first coil, a second coil, and a third coil, the second coil and third coil being arranged at positions symmetric to each other with respect to the first coil in a vehicle width direction.

8. A parking assistance method used in a wireless power supply system which performs wireless power supply between a power transmitting coil on a ground side and a power receiving coil on a vehicle side, the parking assistance method comprising:
detecting magnetic flux in a height direction of the vehicle which is generated by the power transmitting coil, by using three or more coils aligned in one direction in a plan view of the vehicle;
detecting misalignment between the power transmitting coil and the power receiving coil in the one direction, based on a decrease in the magnetic flux in the height direction of the vehicle which is detected by the three or more coils; and
notifying a user of a result of the misalignment detection.

9. The parking assistance method according to claim 8, further comprising:
detecting a short-circuit phenomenon of the magnetic flux above an inner portion of the power transmitting coil based on the decrease in the magnetic flux; and
detecting misalignment based on the short-circuit phenomenon.

10. The parking assistance method according to claim 8, wherein
the three or more coils include a first coil, a second coil, and a third coil, the second coil and third coil being arranged at positions symmetric to each other with respect to the first coil in a vehicle width direction.

* * * * *